(12) United States Patent
Schulz et al.

(10) Patent No.: US 11,524,462 B2
(45) Date of Patent: Dec. 13, 2022

(54) APPARATUS FOR ADDITIVELY MANUFACTURING THREE-DIMENSIONAL OBJECTS

(71) Applicant: CONCEPT LASER GMBH, Lichtenfels (DE)

(72) Inventors: Thomas Schulz, Gerach (DE); Stephan Hunze, Lichtenfels (DE); Jens Junge, Neustadt bei Coburg (DE)

(73) Assignee: CONCEPT LASER GMBH, Lichtenfels (DE)

( * ) Notice: Subject to any disclaimer, the term of this patent is extended or adjusted under 35 U.S.C. 154(b) by 862 days.

(21) Appl. No.: 16/292,332

(22) Filed: Mar. 5, 2019

(65) Prior Publication Data

US 2020/0139632 A1 May 7, 2020

(30) Foreign Application Priority Data

Nov. 6, 2018 (EP) ..................... 18204653

(51) Int. Cl.
*B29C 64/393* (2017.01)
*B22F 10/20* (2021.01)
(Continued)

(52) U.S. Cl.
CPC ............ *B29C 64/393* (2017.08); *B22F 10/20* (2021.01); *B29C 64/153* (2017.08);
(Continued)

(58) Field of Classification Search
CPC ... B29C 64/393; B29C 64/268; B29C 64/277; B22F 10/30; B33Y 10/00; B33Y 30/00;
(Continued)

(56) References Cited

U.S. PATENT DOCUMENTS 6,621,060 B1 * 9/2003 Nantel .................. B23K 26/04
250/201.4
11,179,806 B2 * 11/2021 Herzog ................ B23K 26/046
(Continued)

FOREIGN PATENT DOCUMENTS

| WO | WO2015/040433 A2 | 3/2015 |
| WO | WO2018/086996 A1 | 5/2018 |
| WO | WO 2018153687 A1 | 8/2018 |

OTHER PUBLICATIONS

European Search Report Corresponding to EP18204653.2 dated May 16, 2019.

*Primary Examiner* — Michael J Brown
(74) *Attorney, Agent, or Firm* — Dority & Manning, P.A.

(57) ABSTRACT

Apparatus for additively manufacturing three-dimensional objects by means of successive layerwise selective irradiation and consolidation of layers of a build material which can be consolidated by means of an energy beam, which apparatus comprises an irradiation device adapted to guide an energy beam across a build plane, wherein a calibration device is provided comprising a positioning unit, a determination unit and a calibration unit, preferably arranged in a process chamber of the apparatus, that is adapted to at least partially reflect the energy beam, wherein the irradiation device is adapted to guide the energy beam to the calibration unit for generating a reflected part of the energy beam, wherein the positioning unit is adapted to position the irradiation device dependent on at least one parameter of the reflected part of the energy beam determined via the determination unit.

23 Claims, 2 Drawing Sheets

(51) Int. Cl.
*B29C 64/153* (2017.01)
*B29C 64/277* (2017.01)
*B29C 64/268* (2017.01)
*B23K 26/70* (2014.01)
*B33Y 10/00* (2015.01)
*B33Y 30/00* (2015.01)
*B33Y 50/02* (2015.01)
*B29C 64/371* (2017.01)
*B22F 10/30* (2021.01)

(52) U.S. Cl.
CPC .......... *B29C 64/268* (2017.08); *B29C 64/277* (2017.08); *B22F 10/30* (2021.01); *B22F 2201/11* (2013.01); *B29C 64/371* (2017.08); *B33Y 10/00* (2014.12); *B33Y 30/00* (2014.12); *B33Y 50/02* (2014.12)

(58) Field of Classification Search
CPC ......... B33Y 50/02; Y02P 10/25; B23K 26/04; B23K 26/705; B23K 26/707
USPC ....................................................... 700/117
See application file for complete search history.

(56) References Cited

U.S. PATENT DOCUMENTS

| | | |
|---|---|---|
| 2016/0114431 A1 | 4/2016 | Cheverton et al. |
| 2016/0236279 A1 | 8/2016 | Ashton et al. |
| 2019/0270161 A1 | 9/2019 | Allenberg-Rabe et al. |
| 2020/0023585 A1* | 1/2020 | Wiesner ............... B23K 26/342 |

* cited by examiner

FIG 1

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 204 653.2 filed Nov. 6, 2018, the contents of which is incorporated herein by reference in its entirety as if set forth verbatim.

The invention relates to an apparatus for additively manufacturing three-dimensional objects by means of successive layerwise selective irradiation and consolidation of layers of a build material which can be consolidated by means of an energy beam, which apparatus comprises an irradiation device adapted to guide an energy beam across a build plane.

Apparatuses for additively manufacturing of three-dimensional objects in which an irradiation device is used to selectively consolidate layers of a build material to build three-dimensional objects are generally known from prior art. Usually, an irradiation device is provided that generates the energy beam and is adapted to guide the energy beam across a build plane. Further, it is known from prior art that meeting different irradiation parameters is crucial for the process quality and the object quality during the additive manufacturing process. For example, a defined focal length and a defined spatial position have to be met to ensure that a defined amount of energy is deposited in the build material in the irradiation process.

Due to different effects during the additive manufacturing process, such as thermal elongation of components, the irradiation parameter can vary or an adjustment of the irradiation parameter may become necessary. Thus, the irradiation device might fail to meet the proper irradiation parameter, e.g. the irradiation device might generate and guide the energy beam with an irradiation parameter deviant from a nominal value, e.g. a positioning accuracy of a spot of the energy beam in the build plane or a focal length or focal position accuracy is not met due to the different effects occurring during the additive manufacturing process.

For compensating these effects it is known from prior art that the focal position or the spatial position or a deviation from a nominal focal position or a nominal spatial position may be determined and, e.g. in advance to an additive manufacturing process, the irradiation device may be calibrated. For example, it is possible to irradiate a test specimen with a defined (line) pattern and determine proper irradiation parameters, e.g. a proper focal length or proper positioning parameters. However, it is not possible to (automatically) calibrate the position of the irradiation device, in particular during an additive manufacturing process.

It is an object of the present invention to provide an improved apparatus for additively manufacturing three-dimensional objects, in particular allowing for an improved, preferably automated, calibration of the irradiation device.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective apparatus can be an apparatus in which an application of build material and a consolidation of build material is performed separately, such as a selective laser sintering apparatus or a selective laser melting apparatus. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to an apparatus for additively manufacturing three-dimensional objects comprising an irradiation device that is used to selectively irradiate build material to successively built a three-dimensional object. The invention is based on the idea that a calibration device is provided comprising a positioning unit, a determination unit and a calibration unit, preferably arranged in a process chamber of the apparatus, which calibration unit is adapted to at least partially reflect the energy beam, wherein the irradiation device is adapted to guide the energy beam to the calibration unit for generating a reflected part of the energy beam, wherein the positioning unit is adapted to position the irradiation device dependent on at least one parameter of the reflected part of the energy beam determined via the determination unit.

In other words, a calibration device is used to calibrate the inventive apparatus, in particular the irradiation device of the inventive apparatus. The calibration device comprises a determination unit that is adapted to determine at least one parameter of the energy beam, in particular the reflected part of the energy beam guided to the determination unit, e.g. to a detector element, such as a CCD or CMOS detector. To determine the at least one parameter of the reflected part of the energy beam, the energy beam can be guided via the irradiation device to a calibration unit which can be considered part of the calibration device. The calibration unit is adapted to reflect at least one part of the energy beam thereby, generating a "reflected part" of the energy beam. In other words, the energy beam is incident on the calibration unit and at least one part of the energy beam is reflected at the calibration unit or reflected by the calibration unit, respectively.

The reflected part of the energy beam is therefore, guided via the calibration unit to the determination unit allowing for a determination of the at least one parameter of the reflected part of the energy beam, as described before. Based on the at least one parameter, the positioning unit can position the irradiation device. Hence, the irradiation device may be positioned, e.g. relative to a build plane in which build material is arranged in a regular mode of operation of the apparatus. Thus, the positioning unit is adapted to actively move/(re-) position the irradiation device and therefore, calibrate the irradiation device regarding the spatial position, for example with respect to the process chamber or the build plane. The determination unit is arranged outside the process chamber, e.g. in a housing of an irradiation unit. Hence, the determination unit is essentially thermally decoupled from the process chamber.

Preferably, the irradiation device may be arranged on a calibration body that is movably coupled with the positioning unit. Hence, the irradiation device may be mounted to a calibration body, e.g. a plate or a frame or the like which can be moved via the positioning unit. Thus, the positioning unit may move/change the position and/or orientation of the calibration body and therefore, change the position and/or orientation of the irradiation device, e.g. relative to the build plane or any other arbitrary reference point or reference plane of the apparatus. Therefore, it is possible to actively move the irradiation device and change the orientation of the irradiation device to ensure that the energy beam is guided to the correct spatial position, that the energy beam is incident on the build plane under a nominal angle of incidence and that a nominal focal position is met, e.g. assuring that a nominal spot size and spot shape is met in the build plane.

Advantageously, it is possible that the position of the irradiation device may be changed, e.g. between two irradiation steps of the same additive manufacturing process. For example, it is possible to guide the energy beam to the calibration unit between two (successive) irradiation steps and to determine whether the at least one parameter of the reflected part of the energy beam meets a nominal parameter or a nominal value, respectively. Dependent on whether a deviation between the nominal parameter and the determined parameter of the energy beam occurs, the positioning unit may position the irradiation device accordingly. The term "irradiation device" in the scope of this application may refer to a device comprising at least one unit or module that contributes to the generation and/or guiding of the energy beam in the apparatus. Hence, it is also possible that only a minor part of the irradiation device is adjusted by the positioning unit, e.g. a beam guiding unit, such as a scanner. The irradiation device is not fixedly mounted to a frame of the apparatus as in additively manufacturing apparatuses known from prior art, but the irradiation device is, inter alia, mounted to the calibration body which is movably coupled with the positioning unit, e.g. can be moved via the positioning unit dependent on the at least one determined parameter. Of course, the irradiation device or parts thereof may also be mounted to a frame (structure) of the apparatus, as long as an adjustment via the positioning unit is possible.

According to a preferred embodiment of the inventive apparatus, the positioning unit may be adapted to position (move) the irradiation device along at least one reference axis, preferably along an x- and y- and z-axis, and/or around at least one reference axis, preferably around an x- and y- and z-axis. In principle, it is possible to arbitrarily move the irradiation device via the positioning unit, for example with respect to a machine axis of the apparatus. Such a machine axis can be used as reference axis, for example an axis relating to an application direction along which an application element is moved to apply build material, a streaming direction of a gas stream in the process chamber or an orientation of the build plane, for example the parallel to the edges of a build plane, a process plane and the like. Of course, besides changing the spatial position of the irradiation device, it is also possible to change the orientation of the irradiation device by turning or moving the irradiation device around at least one reference axis.

According to another preferred embodiment of the inventive apparatus, the calibration unit may be arranged in a reference plane, in particular in a process plane of the apparatus. The term "process plane" in the scope of this application may refer to the plane in which the build plane is arranged or is comprised, respectively. For example, the process plane may comprise a dose plane, a build plane and an overflow, wherein build material may be provided in the dose plane and conveyed via an application unit to the build plane, wherein surplus build material may be deposited in an opening of the overflow. Of course, any other arbitrary arrangement, e.g. involving a direct application of build material in the build plane, is also possible. Further, the calibration unit may be arranged in the build plane, as well. Thus, it is possible to use the calibration unit that is arranged in the reference plane to determine the at least one parameter of the energy beam, wherein it is assured that the at least one determined parameter can be compared with a parameter of the energy beam actually being incident in the build plane for irradiating build material. Thus, a direct relation between the at least one parameter determined with the energy beam being incident on the calibration unit and the energy beam irradiating build material arranged in the build plane is possible.

Further, it is possible that the determination process or the calibration process, respectively, may be performed during an additive manufacturing process, wherein the energy beam may be guided to the calibration unit and reflected at the calibration unit towards the determination unit. The calibration unit may, for example, be arranged in the process plane, wherein the energy beam can be guided to the calibration unit without interfering with other process steps of the additive manufacturing process. For example, it is possible to perform the calibration/determination process during an application of build material, wherein the energy beam is guided to a calibration unit arranged in the process plane outside the build plane in that build material may be applied during the calibration/determination process. Hence, it is possible to use the downtime of the irradiation device in which build material is applied in the build plane for the calibration/determination. Hence, it is particularly possible to perform the calibration/determination process during each or selected application process steps assuring that the irradiation device is properly calibrated for the next irradiation process step without consuming time that can be used for irradiating build material.

The calibration unit may further be arranged in the process plane, in particular next to at least one guiding rail, preferably between two guiding rails of an application unit. As described before, build material may be applied in the build plane via an application unit that can be moved along a guiding rail or which can be moved between two guiding rails across the process plane, in particular across the build plane for conveying build material to the build plane and distributing build material in the build plane. In other words, it is possible to apply a layer of fresh build material via the application unit moved along the guiding rails. The energy beam can be guided to the calibration unit for performing the calibration process, wherein build material may preferably be applied during the calibration process, wherein, of course, build material may be applied in regions of the build plane other than the position of the calibration unit.

For reflecting the energy beam, in particular reflecting at least one part of the energy beam towards the determination unit, the calibration unit comprises at least one reflective region. The calibration unit may entirely be reflective or comprise at least one reflective surface adapted to reflect the part of the energy beam or it is also possible that the calibration unit comprises a reflective element, e.g. attached or mounted to the calibration unit.

The calibration unit may, inter alia, be built as or comprise a reflective prism. For example, the reflective prism may be mounted or integrated in the calibration unit or the calibration unit may be entirely built as a reflective prism, which reflective prism faces the process chamber (e.g. with the top/tip of the prism) for receiving and reflecting the energy beam. Preferably, the top of the reflective prism is arranged in the process plane, wherein the reflective prism may be oriented in a defined direction, e.g. a (symmetry) reference axis extending through the top/tip of the prism may be perpendicular to the process plane. Instead of arranging the calibration unit, e.g. the reflective prism with the tip facing upwards, it is also possible to arrange the calibration unit the other way around, i.e. inverse to the arrangement described above. Hence, the calibration unit being built as or comprising a reflective prism may be arranged in that the base of the prism faces upwards, e.g. faces the irradiation unit.

According to a preferred embodiment of the inventive apparatus, the calibration unit may be arranged in a reference position, in particular the top of the prism, wherein an energy beam incident on the top of the calibration unit (reflective prism) may be reflected to a reference region on a determination element of the determination unit and an energy beam incident on a flank of the calibration unit (reflective prism) may be incident in a region different from the reference region. According to this embodiment, the calibration unit may be arranged in a reference position, wherein preferably the top of the calibration unit is arranged in the reference position, e.g. in the process plane, as described before. With the calibration unit in the reference position, it is possible to determine whether the energy beam is properly calibrated or not, wherein the energy beam incident on the top of the calibration unit can be reflected to the determination unit, as described before. If the energy beam is properly calibrated the reflected part of the energy beam will be incident in a reference region of the determination element of the determination unit. The reference region of the determination element may arbitrarily be chosen, e.g. the center of the determination element, wherein the determination element may preferably be built as detector that enables a spatially resolved determination of the position of the (reflected part of the) energy beam incident on the determination element.

If an energy beam that is not properly calibrated is incident on the calibration unit, e.g. deviant from a nominal spatial position, the energy beam will not be incident on the top/tip of the calibration unit (reflective prism), but will be incident on a flank of the calibration unit (reflective prism). Therefore, the beam path of the reflected part of the energy beam will deviate from a nominal beam path that a reflected part of a properly calibrated energy beam would be guided along. Therefore, the reflected part of an uncalibrated energy beam will be incident on a region of the determination element different from the reference region. Thus, it is possible to determine whether the energy beam is properly calibrated or whether a calibration/repositioning of the irradiation device is necessary. Thus, it is possible to determine the at least one parameter of the reflected part of the energy beam, e.g. the spatial position of the energy beam on the calibration unit or the spatial position of the reflected part of the energy beam on the determination unit. Dependent on the determined parameter it is possible to accordingly position the irradiation device and therefore, compensate a deviation from a nominal parameter of the energy beam.

Preferably, the determination unit comprises a beam splitter which is adapted to split the reflected part of the energy beam in a first and a second part and guide the first part of the reflected part of the energy beam along a first beam path to a focal position determination unit and the second part along a second beam path to a position determination unit. In other words, the determination unit may comprise a beam splitter which splits the reflected part of the energy beam in two parts, namely a first and a second part, wherein the first part and the second part are guided along different beam paths, namely the first and the second beam path. The first part may be guided along a first beam path to a focal position determination unit, wherein the focal position of the energy beam can be determined from the first part of the (reflected part of the) energy beam incident on the focal position determination unit. The second beam part is guided along the second beam path to the position determination unit, e.g. comprising a position sensitive device, such as a camera. Thus, it is possible to determine whether the energy beam is properly calibrated with respect to the focal position of the energy beam and whether the spatial position of (a spot of) the energy beam is properly calibrated or whether a calibration of the irradiation device, e.g. involving a repositioning of the irradiation device in x, y or z-direction and/or around the respective axis is deemed necessary.

It is particularly preferred that the determination unit comprises a determination element, a focusing optical unit and an aperture, wherein the focusing optical unit is arranged in that a focal position of a properly calibrated energy beam lies in the plane of the aperture, i.e. the relative position of the focusing optical unit and the aperture is chosen/adjusted in that the focal position of the first part of the reflected part of the energy beam lies in the aperture plane. In other words, the focal position determination unit may involve an optical unit and an aperture and a determination element. The reflected part of the energy beam can be guided through the optical unit and through the aperture onto the determination element, wherein the determination element may, inter alia, be built as or comprise at least one photo diode. A properly calibrated energy beam will be incident on the focusing optical unit in that dependent on the focal length of the focusing optical unit and the focal position of the reflected part of the energy beam, the focal position of the reflected part of the energy beam will lie in the plane of the aperture or will deviate therefrom. If a deviation between the nominal focal position and the actual focal position occurs, the aperture will absorb (or reflect) a defined part of the reflected part of the energy beam. Therefore, it is possible to perform a maximum detection process via the determination element and a corresponding variation of the position and orientation of the irradiation device to find or adjust the focal position.

The position determination unit may further comprise a position sensitive determination element, preferably a psd-sensor, in particular a quadrant photo diode or a CCD or CMOS sensor. Thus, it is possible to determine the position of the reflected part of the energy beam on the determination element and therefore, conclude on the spatial position of the energy beam in the process plane or whether a deviation from a nominal position (the position of the calibration unit, for instance) occurs.

The determination device may further be adapted to generate calibration information based on the at least one parameter of the reflected part of the energy beam, which calibration information may relate to a calibration status of the irradiation device, in particular comprising a deviation from a nominal focal position and/or a nominal spatial position. As described before, it is possible to decide whether a repositioning of the irradiation device is necessary based on the determined parameter of the energy beam, in particular the reflected part of the energy beam incident on the determination unit. The determination device may generate calibration information that indicates whether the irradiation device is properly calibrated or whether the irradiation device has to be calibrated, e.g. moved in at least one direction or around at least one axis via the positioning unit.

Further, the positioning unit may be adapted to position the irradiation device based on the calibration information, preferably in a closed-loop process. To perform the closed-loop process, it is possible that the energy beam is guided to the calibration unit, wherein at least one part of the energy beam is reflected towards the determination unit. The determination unit may perform the determination process of the at least one parameter of the energy beam, e.g. relating to a spatial position and/or a focal position of the energy beam, as described before. Dependent on the determined parameter calibration information may be generated indicating whether a repositioning of the irradiation device is necessary. For example, the irradiation device may be repositioned dependent on the at least one determined parameter. Subsequently, it is possible to determine at least one parameter of the reflected part of the energy beam after the repositioning of the irradiation device has been performed to verify, whether the repositioning of the irradiation device compensated the deviation from the nominal parameter of the energy beam. Of course, the determination process may be performed continuously or in defined time intervals, e.g. once in each application step in which build material is applied in the build plane.

Besides, the invention relates to a calibration device for calibrating an irradiation device, in particular an irradiation device of an apparatus for additively manufacturing three-dimensional objects by means of successive layerwise selective irradiation and consolidation of layers of a build material which can be consolidated by means of an energy beam, in particular an inventive apparatus, as described before, which apparatus comprises an irradiation device adapted to guide an energy beam across a build plane, wherein the calibration device comprises a positioning unit, a determination unit and a calibration unit, preferably arrangeable or arranged in a process chamber of the apparatus, that is adapted to at least partially reflect the energy beam, wherein the irradiation device is adapted to guide the energy beam to the calibration unit for generating a reflected part of the energy beam, wherein the positioning unit is adapted to position the irradiation device dependent on at least one parameter of the reflected part of the energy beam determined via the determination unit.

Further, the invention relates to a method for operating an apparatus for additively manufacturing three-dimensional objects by means of successive layerwise selective irradiation and consolidation of layers of a build material which can be consolidated by means of an energy beam, in particular an inventive apparatus, as described before, comprising the steps:

guiding the energy beam to a calibration unit, preferably arrangeable or arranged in a process chamber of the apparatus, for generating a reflected part of the energy beam guiding the reflected part of the energy beam to a determination unit of a calibration device, in particular an inventive determination device, as described before, determining at least one parameter of the reflected part of the energy beam via the determination unit positioning the irradiation device via a positioning unit dependent on the at least one determined parameter of the reflected part of the energy beam.

Preferably, the inventive method may be performed in that at first, a spatial position of the energy beam is determined, e.g. with respect to a nominal spatial position, e.g. a reference position, such as the position of the calibration unit, in particular the top of the calibration unit. Secondly, a focal position is determined, as described before. The method may preferably be performed during an application process in which build material is applied in the build plane.

Further, it is possible that the apparatus comprises multiple calibration units in more than one position, e.g. in three different calibration units in different reference positions, preferably arranged in the process plane. Thus, it is possible to determine the at least one parameter of the energy beam for more than one position to ensure that the irradiation device is properly calibrated and that an energy beam guided to various positions in the process plane meets defined requirements.

Self-evidently, all details, features and advantages described with respect to the inventive apparatus are fully transferable to the inventive calibration device and the inventive method and vice versa.

Exemplary embodiments of the invention are described with reference to the Fig. The Fig. are schematic diagrams, wherein.

Figure 1:
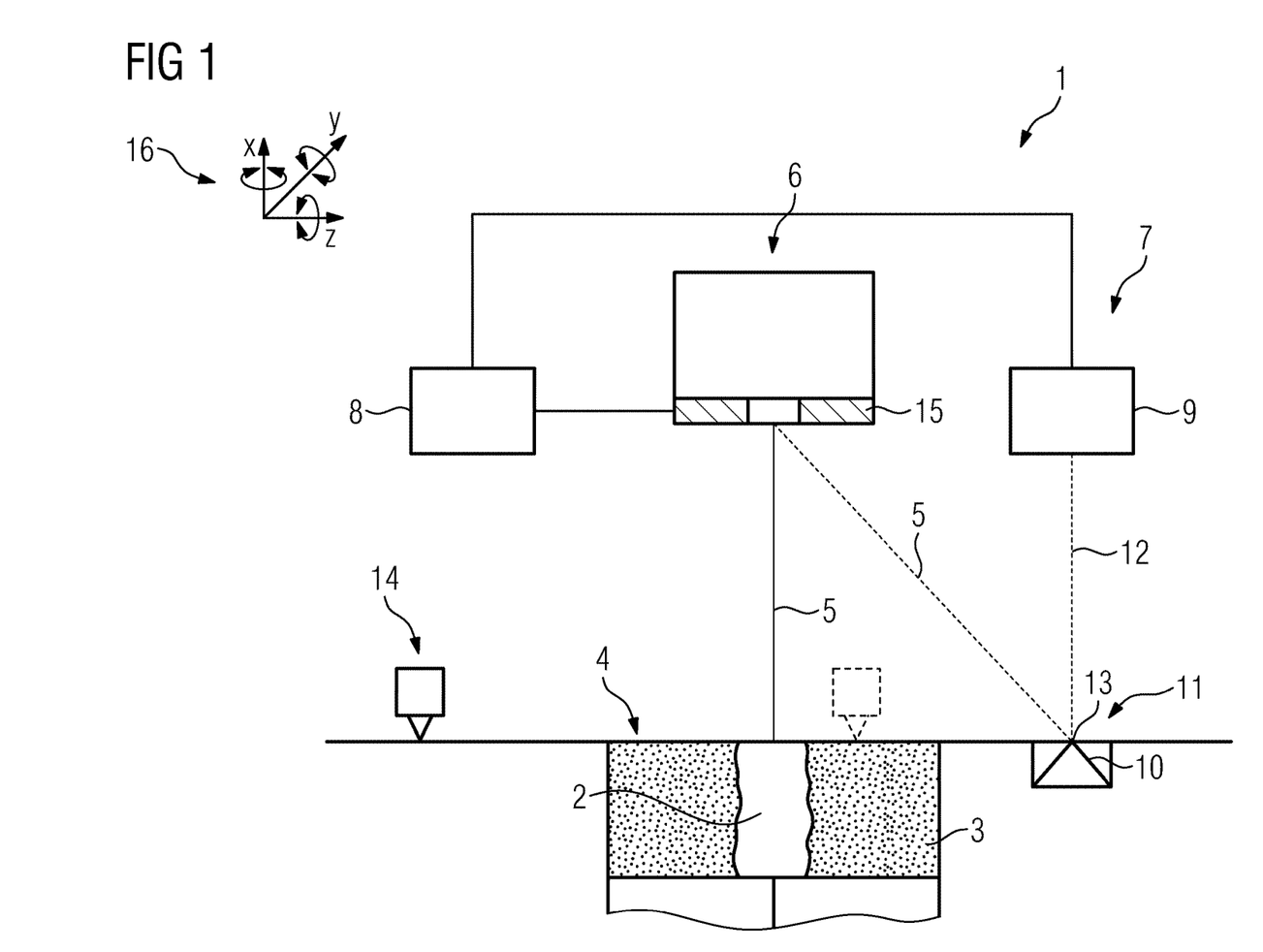
FIG. 1 shows an inventive apparatus.

FIG. 1 shows an apparatus 1 for additively manufacturing three-dimensional objects 2 by means of successive layerwise selective irradiation and consolidation of layers of a build material 3. In this exemplary embodiment, build material 3 is arranged in a build plane 4 to be selectively irradiated via an energy beam 5, e.g. a laser beam, that is generated and guided via an irradiation device 6.

The apparatus 1 comprises a calibration device 7 comprising a positioning unit 8, a determination unit 9 and a calibration unit 10, which is built as reflective prism, for instance. Of course, the irradiation device 6 and the determination unit 9 are arranged outside a process chamber in which the additive manufacturing process is performed. Hence, the irradiation device 6 and the determination unit 9 are thermally decoupled from the environment inside the process chamber, e.g. high temperatures. It is further possible to actively cool the irradiation device 6 and the determination unit 9 via a cooling unit (not shown).

The calibration unit 10 is arranged in a process plane 11 of the apparatus 1 and is adapted to reflect a part 12 of the energy beam 5 towards the determination unit 9. Hence, the irradiation device 6 is adapted to guide the energy beam 5 (depicted as dashed line) to the calibration unit 10 from where it is reflected to the determination unit 9. It is possible to determine at least one parameter of the reflected part 12 of the energy beam 5 via the determination unit 9, e.g. a spatial position or a focal position of the reflected part 12 of the energy beam 5 and conclude on the corresponding parameter of the energy beam 5, e.g. a spatial position or focal position in the process plane 11.

The positioning unit 8 can be used to move/(re-) position the irradiation device 6 dependent on the at least one determined parameter of the reflected part 12 of the energy beam 5 that has been determined via the determination unit 9. In other words, the irradiation device 6 may be positioned dependent on the at least one parameter that has been determined via the determination unit 9. Thus, if a deviation in the positioning (spatial position, focal position) of the energy beam 5 occurs, the reflected part 12 of the energy beam 5 is reflected differently compared with a reflected part 12 of the energy beam 5 being incident on the calibration unit 10 in a reference position, e.g. on the top 13 of the calibration unit 10 (the tip of the reflective prism). Therefore, it is possible to derive based on the at least one parameter of the reflected part 12 of the energy beam 5 determined via the determination unit 9 whether the energy beam 5 is properly calibrated or whether a calibration of the irradiation device 6 is necessary.

Preferably, the determination process in which the at least one parameter of the reflected part 12 of the energy beam 5 is determined is performed during an application step in which an application unit 14 is used to apply build material 3 in the build plane 4. Of course, any arbitrary application unit may be used instead of a recoater. During the application process in which build material 3 is applied in the build plane 4, the energy beam 5 can be used to irradiate build material 3. Thus, performing the determination process during the application process is time efficient, as the energy beam 5 cannot be used to irradiate build material 3. Hence, an additional downtime of the apparatus 1 can be avoided, as the time in which the energy beam 5 cannot be used to irradiate build material 3 is used for determining the at least one parameter of the reflected part 12 of the energy beam 5.

It is possible to determine the at least one parameter of the reflected part 12 of the energy beam 5 for each application process step or for defined (selected) application process steps, e.g. every fifth application step. It is further possible to perform the determination process and/or the calibration process in a closed-loop process, wherein the positioning of the irradiation device 6 via the positioning unit 8 is performed dependent on the at least one parameter that has been determined via the determination unit 9. Thus, it is possible to verify whether the positioning of the irradiation device 6 causes the energy beam 5 to meet nominal parameters, e.g. a nominal spatial position and/or a nominal focal position.

In this exemplary embodiment, the irradiation device 6 is mounted to a calibration body 15, e.g. a metal plate that is movably coupled with the positioning unit 8, e.g. an actuator, preferably comprising one or more motors. The positioning unit 8 may be adapted to move/position the irradiation device 6 along the axis x, y and z and rotate the irradiation device 6 around the axis x, y and z, as indicated via the coordinate system 16.

Figure 2:
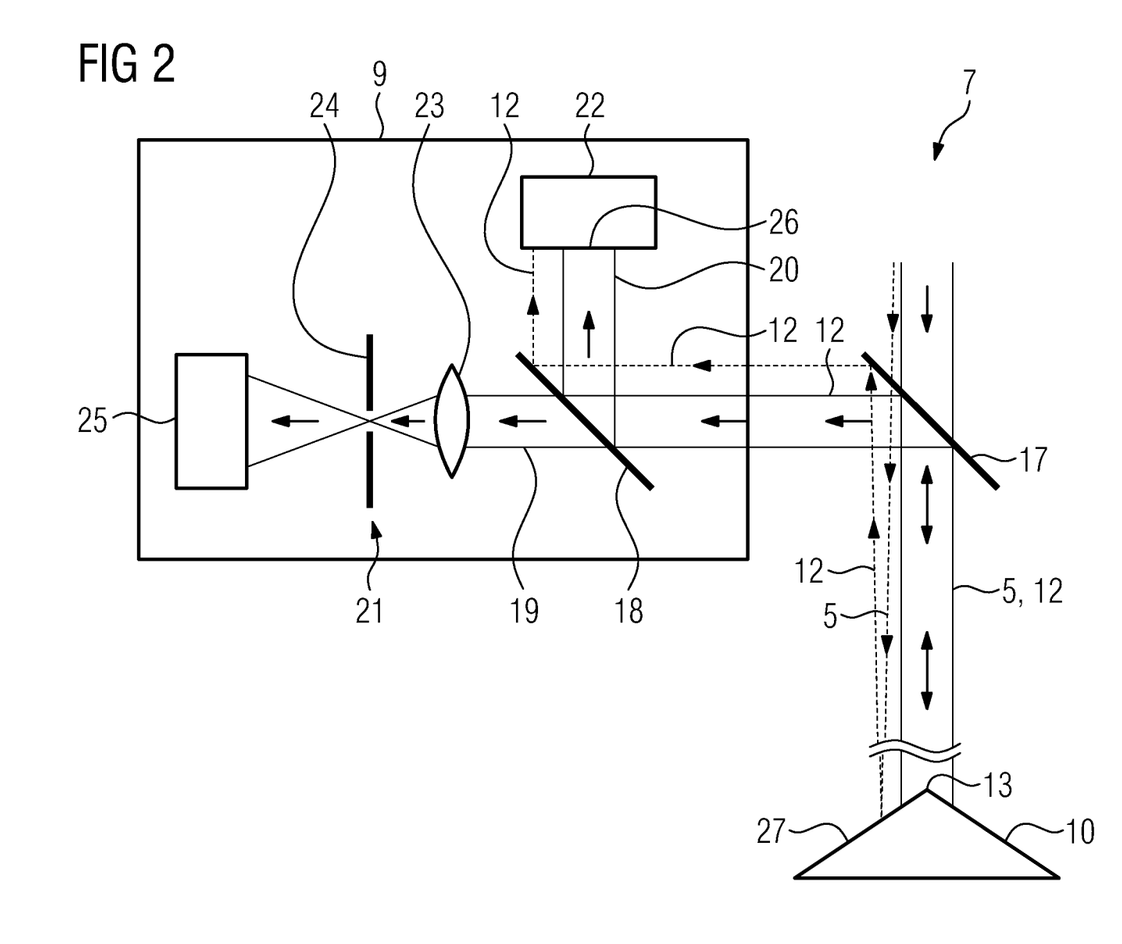
FIG. 2 shows a detailed view of the determination device of the apparatus from FIG. 1.

FIG. 2 shows the determination unit 9 and the calibration unit 10 in detail. As depicted, a properly calibrated energy beam 5, e.g. an energy beam 5 generated and guided via a properly calibrated irradiation device 6, is incident on the top 13 of the calibration unit 10 (tip of the reflective prism). The part 12 of the energy beam 5 is therefore, reflected along the same beam path as the incoming energy beam 5. The reflected part 12 of the energy beam is reflected at a mirror element 17 and guided towards the determination unit 9, as described before. Instead of arranging the calibration unit 10, e.g. the reflective prism with the tip facing upwards, it is also possible to arrange the calibration unit 10 the other way around, i.e. inverse to the arrangement described above. Hence, the calibration unit 10 being built as or comprising a reflective prism may be arranged in that the base of the reflective prism faces upwards, e.g. faces the irradiation device 6.

The determination unit 9 comprises a beam splitter 18 that is adapted to split the reflected part 12 of the energy beam 5 into a first part 19 and a second part 20, wherein the first part 19 of the reflected part 12 of the energy beam 5 is guided along a first beam path to a focal position determination unit 21 and the second part 20 is guided along a second beam path to a position determination unit 22. The focal position determination unit 21 to which the first part 19 of the reflected part 12 is guided, is adapted to determine the focal position of the energy beam 5, in particular via the focal position of the reflected part 12 of the energy beam 5.

The focal position determination unit 21 comprises an optical unit 23, in particular a lens, an aperture 24 and a determination element 25, e.g. a photo diode. As can be derived from FIG. 2, the first part 19 of the reflected part 12 of the energy beam 5 can only entirely pass the aperture 24, if the focal position meets a nominal focal position. If the focal position of the energy beam 5 deviates from a nominal focal position, the focal position of the first part 19 of the reflected part 12 of the energy beam 5 will lie before or after the plane of the aperture 24 and therefore, a defined part of the first part 19 of the reflected part 12 of the energy beam 5 will be absorbed or reflected via the aperture 24. Thus, it is possible to determine the focal position of the first part 19 and conclude on whether the energy beam 5 is properly focused via a maximum detection procedure performed via the determination element 25.

The second part 20 of the reflected part 12 is guided to the position determination unit 22, which can be built as or comprise a position sensitive device, e.g. a camera. The position determination unit 22 comprises a reference region 26 to which the reflected part 12 of the energy beam 5, in particular the second part 20, is guided, if the energy beam 5 is properly calibrated. Besides, an energy beam 5 that is not properly calibrated or that is generated and guided via an irradiation device 6 that is not properly calibrated, respectively, is depicted via a dashed line with arrows. This energy beam 5 is not incident on the calibration unit 10 in the top 13 of the calibration unit 10 (tip of the reflective prism), but is incident on a flank 27 of the calibration unit 10 (flank of the reflective prism). Therefore, the reflected part 12 of this energy beam 5 is not reflected towards the mirror element 17 on the same beam path as the incoming energy beam 5. This deviation between the incoming energy beam 5 and the reflected part 12 causes the reflected part 12 to be incident on the position determination unit 22 in a region other than the reference region 26. Therefore, the determination unit 9 is adapted to determine that a deviation between the nominal spatial position and the actual spatial position of the energy beam 5 occurs. Thus, it is possible to control the positioning unit 8 in that the irradiation device 6 is moved accordingly, e.g. repositioned along at least one of the x, y and z-axis.

Of course, it is also possible that the energy beam 5 is not properly calibrated with respect to its focal position. In this case, the first part 19 of the reflected part 12 of the energy beam will be at least partially absorbed via the aperture 24 and therefore, the irradiation device 6 may be repositioned via the positioning unit 8 until the maximum intensity is found incident on the determination element 25 indicating a proper focal position.

Of course, the inventive method may be performed on the apparatus 1.

The invention claimed is:

1. An apparatus for additively manufacturing a three-dimensional object by successive layerwise selective irradiation and consolidation of layers of a build material consolidated by an energy beam, the apparatus comprising:
   an irradiation device adapted to guide the energy beam across a build plane;

a calibration device comprising a positioning unit, a determination unit, and a calibration unit arrangeable or arranged in a process chamber of the apparatus, the calibration device being adapted to at least partially reflect the energy beam;

wherein the irradiation device is adapted to guide the energy beam to the calibration unit to generate a reflected part of the energy beam;

wherein the positioning unit is adapted to position the irradiation device dependent on at least one parameter of the reflected part of the energy beam determined via the determination unit;

wherein an energy beam incident on a top of the calibration unit is reflected to a reference region on a determination element of the determination unit and an energy beam incident on a flank of the calibration unit is incident in a region different from the reference region.

2. The apparatus according to claim 1, wherein the irradiation device is arranged on a calibration body that is moveably coupled with the positioning unit.

3. The apparatus according to claim 1, wherein the positioning unit is adapted to position the irradiation device along at least one reference axis and/or around the at least one reference axis.

4. The apparatus according to claim 1, wherein the calibration unit is arranged in a process plane of the apparatus.

5. The apparatus according to claim 1, wherein the calibration unit is arranged in a process plane of the apparatus between two guiding rails of an application unit.

6. The apparatus according to claim 1, wherein the calibration unit comprises at least one reflective region.

7. The apparatus according to claim 1, wherein the calibration unit is built as or comprises a reflective prism.

8. The apparatus according to claim 1, wherein the top of the calibration unit is arranged in a reference position.

9. The apparatus according to claim 1, wherein the determination unit comprises a beam splitter adapted to split the reflected part of the energy beam into a first part and a second part and guide the first part of the reflected part of the energy beam along a first beam path to a focal position determination unit and the second part along a second beam path to a position determination unit.

10. The apparatus according to claim 9, wherein the focal position determination unit comprises a determination element, a focusing optical unit, and an aperture, wherein the focusing optical unit is arranged in that a focal position of a properly calibrated energy beam lies in a plane of the aperture.

11. The apparatus according to claim 9, wherein the position determination unit comprises a position sensitive determination element, a psd-sensor, a quadrant photo diode, a charge coupled device (CCD), or a complementary metal oxide semiconductor (CMOS).

12. The apparatus according to claim 1, wherein the calibration device is adapted to generate calibration information based on the at least one parameter of the reflected part of the energy beam, which calibration information relates to a calibration status of the irradiation device comprising a deviation from a nominal focal position and/or a nominal spatial position.

13. The apparatus according to claim 12, wherein the positioning unit is adapted to position the irradiation device based on the calibration information in a closed loop process during an application step.

14. A calibration device for calibrating an irradiation device of the apparatus according to claim 1, the calibration device comprising:

the positioning unit, the determination unit, and the calibration unit arrangeable or arranged in the process chamber of the apparatus adapted to at least partially reflect the energy beam;

wherein the irradiation device is adapted to guide the energy beam to the calibration unit to generate the reflected part of the energy beam;

wherein the positioning unit is adapted to position the irradiation device dependent on the at least one parameter of the reflected part of the energy beam determined via the determination unit.

15. A method for operating the apparatus according to claim 1, the method comprising:

guiding the energy beam to the calibration unit arrangeable or arranged in the process chamber of the apparatus to generate the reflected part of the energy beam;

guiding the reflected part of the energy beam to the determination unit of the determination device;

determining the at least one parameter of the reflected part of the energy beam via the determination unit; and positioning the irradiation device via the positioning unit dependent on the at least one determined parameter of the reflected part of the energy beam.

16. An apparatus for additively manufacturing a three-dimensional object by successive layerwise selective irradiation and consolidation of layers of a build material consolidated by an energy beam, the apparatus comprising:

an irradiation device adapted to guide the energy beam across a build plane;

a calibration device comprising a positioning unit, a determination unit, and a calibration unit arrangeable or arranged in a process chamber of the apparatus, the calibration device being adapted to at least partially reflect the energy beam;

wherein the irradiation device is adapted to guide the energy beam to the calibration unit to generate a reflected part of the energy beam;

wherein the positioning unit is adapted to position the irradiation device dependent on at least one parameter of the reflected part of the energy beam determined via the determination unit;

wherein the determination unit comprises a beam splitter adapted to split the reflected part of the energy beam into a first part and a second part and guide the first part of the reflected part of the energy beam along a first beam path to a focal position determination unit and the second part along a second beam path to a position determination unit.

17. The apparatus according to claim 16, wherein a top of the calibration unit is arranged in a reference position, wherein the energy beam incident on the top of the calibration unit is reflected to a reference region on a determination element of the determination unit and the energy beam incident on a flank of the calibration unit is incident in a region different from the reference region.

18. The apparatus according to claim 16, wherein the focal position determination unit comprises a determination element, a focusing optical unit, and an aperture, wherein the focusing optical unit is arranged in that a focal position of a properly calibrated energy beam lies in a plane of the aperture.

19. The apparatus according to claim 16, wherein the position determination unit comprises a position sensitive determination element, a psd-sensor, a quadrant photo diode, a charge coupled device (CCD), or a complementary metal oxide semiconductor (CMOS).

20. The apparatus according to claim 16, wherein the calibration device is adapted to generate calibration information based on the at least one parameter of the reflected part of the energy beam, which calibration information relates to a calibration status of the irradiation device comprising a deviation from a nominal focal position and/or a nominal spatial position.

21. The apparatus according to claim 20, wherein the positioning unit is adapted to position the irradiation device based on the calibration information in a closed loop process during an application step.

22. A calibration device for calibrating an irradiation device of the apparatus according to claim 16, the calibration device comprising:
the positioning unit, the determination unit, and the calibration unit arrangeable or arranged in the process chamber of the apparatus adapted to at least partially reflect the energy beam;
wherein the irradiation device is adapted to guide the energy beam to the calibration unit to generate the reflected part of the energy beam;
wherein the positioning unit is adapted to position the irradiation device dependent on the at least one parameter of the reflected part of the energy beam determined via the determination unit.

23. A method for operating the apparatus according to claim 16, the method comprising:
guiding the energy beam to the calibration unit arrangeable or arranged in a process chamber of the apparatus to generate the reflected part of the energy beam;
guiding the reflected part of the energy beam to the determination unit of the determination device;
determining the at least one parameter of the reflected part of the energy beam via the determination unit; and
positioning the irradiation device via the positioning unit dependent on the at least one determined parameter of the reflected part of the energy beam.

* * * * *